United States Patent [19]

Bäbler

[11] 4,231,918

[45] Nov. 4, 1980

[54] PROCESS FOR THE MASS COLORATION OF LINEAR POLYESTERS

[75] Inventor: Fridolin Bäbler, Allschwil, Switzerland

[73] Assignee: Ciba-Geigy Corporation, Ardsley, N.Y.

[21] Appl. No.: 942,517

[22] Filed: Sep. 15, 1978

[30] Foreign Application Priority Data

Sep. 23, 1977 [CH] Switzerland .................. 11652/77

[51] Int. Cl.³ .................. C08K 5/23; C08K 5/34; C08K 5/35; C08K 5/45
[52] U.S. Cl. .................. 260/40 P; 544/99; 548/327; 260/322
[58] Field of Search .................. 260/40 P, 40 R, 246

[56] References Cited

U.S. PATENT DOCUMENTS

| | | | |
|---|---|---|---|
| 2,571,319 | 10/1951 | Waters et al. | 260/40 P X |
| 3,009,913 | 11/1961 | Pugin et al. | 260/246 |
| 3,793,341 | 2/1974 | Genta | 260/40 P X |
| 3,929,719 | 12/1975 | Pugin et al. | 260/40 P |
| 3,963,429 | 6/1976 | Tsujimoto et al. | 8/38 |

*Primary Examiner*—S. M. Person
*Attorney, Agent, or Firm*—Joseph F. DiPrima; Harry Falber

[57] ABSTRACT

A process for the mass coloration of linear polyesters wherein the colorant is a mixture of consisting of 0.05 to 0.35% by weight, based on the amount of polyester, of a thioindigo and/or dioxazine pigment and one or more polymer-soluble dyes which are different therefrom. Unexpectedly brilliant strong colorations of excellent lightfastness are obtained.

9 Claims, No Drawings

PROCESS FOR THE MASS COLORATION OF LINEAR POLYESTERS

It has been found that unexpectedly brilliant, strong shades of excellent lightfastness are obtained in the mass colouration of linear polyesters by using as colourant a mixture consisting of 0.05 to 0.35% by weight, preferably 0.10 to 0.25% by weight, of a thioindigo and/or dioxazine pigment and one or more polymer-soluble dyes which are different therefrom.

The term thioindigo pigment comprises both the thioindigo pigments which can be obtained by treating hydroxythionaphthene with oxidising agents or by condensing a hydroxythionaphthene with a reactive derivative thereof, and the thioindigo pigments which can be obtained by condensing a hydroxythionaphthene with an isatine.

Particularly interesting pigments are those of the formula

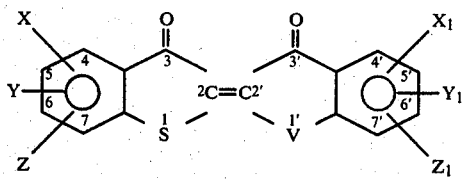

wherein V represents a sulfur atom or a —NH group, X and $X_1$ represent hydrogen or halogen atoms, alkyl or alkoxy groups of 1 to 4 carbon atoms, alkylsulfonyl groups of 1 to 4 carbon atoms or a phenoxy or phenylsulfonyl group which is unsubstituted or substituted by halogen atoms or alkyl or alkoxy groups of 1 to 4 carbon atoms, Y, $Y_1$, Z and $Z_1$ represent hydrogen or halogen atoms or methyl groups, or wherein X and Y or $X_1$ and $Y_1$ form a fused benzene nucleus which can be substituted for example by halogen atoms, alkyl or alkoxy groups of 1 to 4 carbon atoms.
Examples of such pigments are:
thioindigo
6,6'-dichlorothioindigo
7,7'-dichlorothioindigo
5,5'-dibromothioindigo
4,4',7,7'-tetrachlorothioindigo
6,6'-dimethoxythioindigo
5,6'-dimethoxythioindigo
6,6'-diethoxythioindigo
6,6'-dichloro-4,4'-dimethylthioindigo
5,5'-dichloro-4,4', 7,7'-tetramethylthioindigo
6-chloro-4-methyl-6'-methoxythioindigo
5,6'-7-trichloro-4,4'-dimethylthioindigo
5- or 7-phenylsulfonyl-6,6'-dichloro-4,4'-dimethylthioindigo
7-chloro-5,6-benzthioindigo
6-chloro-5-methoxy-7'-chloro-5',6'-benzthioindigo
7-methyl-5,6-benzthioindigo
and the thioindigoids of the formulae

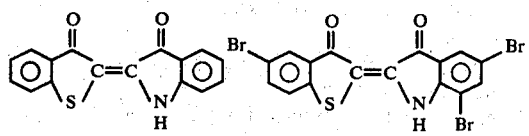

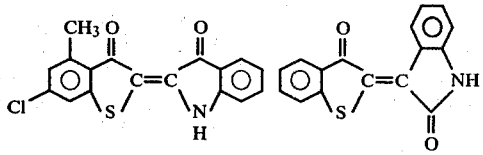

Suitable dioxazine pigments are preferably the triphendioxazines of the formula

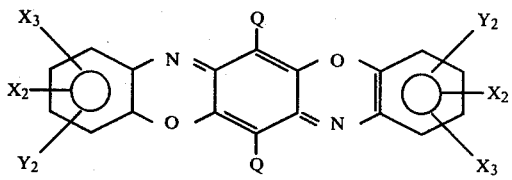

wherein Q represents a chlorine or bromine atom, a phenoxy, phenylmercapto or benzoyl group which is unsubstituted or substituted by halogen or alkyl or alkoxy of 1 to 4 carbon atoms, or represents an alkoxycarbonyl group of 2 to 5 carbon atoms, $Y_2$ represents an alkoxy group of 1 to 12 carbon atoms, a cycloalkoxy group of 5 or 6 carbon atoms, a hydroxyalkoxy group of 2 to 6 carbon atoms, an alkoxyalkoxy or alkanoyloxyalkoxy group of 3 to 8 carbon atoms, a phenoxy group, a phenoxy$(C_2-C_6)$alkoxy group or benzoyloxy$(C_2-C_6)$alkoxy group, whilst the phenyl moieties of the last three substituents can contain halogen atoms or alkyl or alkoxy groups, or represents naphthoxy- or tetrahydronaphthoxy group or a naphthoxy$(C_2-C_6)$alkoxy group or a tetrahydronaphthoxy$(C_2-C_6)$alkoxy group, $X_2$ has the same meaning as $Y_2$ and can additionally represent a hydrogen or halogen atom, an alkanoylamino group of 2 to 6 carbon atoms, a benzoylamino group which is unsubstituted or substituted by halogen or alkyl or alkoxy of 1 to 6 carbon atoms, or represents a trifluoromethyl group, an alkylsulfonyl group of 1 to 6 carbon atoms, a phenyl, benzoyl or phenylmercapto group, $X_3$ represents a hydrogen or halogen atom, or wherein $X_2$ and $X_3$ form a fused benzene ring.
Preferred dioxazines are those of the formula

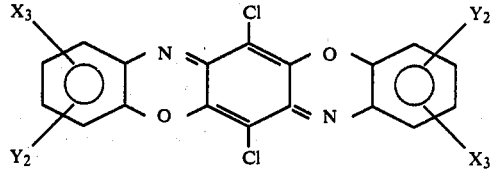

wherein $X_3$ and $Y_2$ have the above meanings. $Y_2$ is preferably in the meta-position to the oxygen or nitrogen atom of the oxazine ring.

As examples of alkoxy groups there may be mentioned methoxy, ethoxy, propoxy, isopropoxy, butoxy, isobutoxy. tert-butoxy, amyloxy, hexyloxy, octyloxy, decyloxy or dodecyloxy groups. Examples of hydroxyalkoxy groups are β-hydroxyethoxy, γ-hydroxypropoxy or σ-hydroxybutoxy groups. Examples of alkoxyalkoxy groups are the β-methoxyethoxy, β-ethoxyethoxy or β-hydroxyethoxyethoxy group. Examples of acyloxyalkoxy groups are β-acetoxyethoxy, β-propoxyethoxy, β-isopropoxyethoxy or β-benzoyloxyethoxy groups. An aryloxyalkoxy group is for example the β-phenoxyethoxy group. Examples of phenalkoxy groups are benzyl, α- or β-phenylethylene groups. Examples of aryloxy groups are phenoxy, o- or p-chlorophenoxy, 2,4-dichlorophenoxy, 2,5-dichlorophenoxy, 2,4,5-trichlorophenoxy, o- or p-methylphenoxy, 2,4- or 2,6-dimethylphenoxy, 2,4,6-trimethylphenoxy, p-tert-butylphenoxy, p-amylphenoxy, o-, m- or p-methoxyphenoxy, p-phenylphenoxy, p-phenoxyphenoxy, β-naphthoxy,2-(5,6,7,8-tetrahydro)naphtoxy or 1-(1,2,3,4-tetrahydro)naphthoxy groups.

Preferred dioxazines are also those of the formula

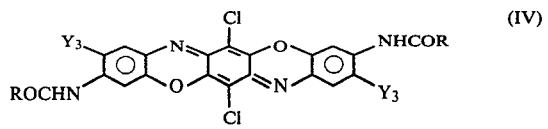
(IV)

wherein R represents alkyl of 1 to 6 carbon atoms or phenyl which is unsubstituted or substituted by halogen or alkyl or alkoxy of 1 to 6 carbon atoms, and $Y_3$ represents alkoxy of 1 to 6 carbon atoms.

Examples of dioxazines of the formula II are the dioxazine pigments disclosed in British patent specifications 1,343,093 and 1,424,209, singly or in mixtures with one another, and, in particular 1,5,9,10-tetrachloro-2,6-dimethoxy-triphendioxazine
1,5,9,10-tetrachloro-2,6-diethoxy-triphendioxazine
1,5,9,10-tetrachloro-2,6-diphenoxy-triphendioxazine
2,6,9,10-tetrachloro-3,7-diethoxy-triphendioxazine
2,6-diacetylamino-3,7-dimethoxy-triphendioxazine
2,6-diacetylamino-3,7-diethoxy-triphendioxazine
2,6-dipropionylamino-3,7-dimethoxy-triphendioxazine
2,6-dipropionylamino-3,7-diethoxy-triphendioxazine
2,6-dibenzoylamino-3,7-dimethoxy-triphendioxazine
2,6-di-(p-chlorobenzoylamino)-3,7-diethoxy-triphendioxazine
2,6-di-(p-chlorobenzoylamino)-3,7-diisopropoxy-triphendioxazine
2,6-dibenzoylamino-3,7-diethoxy-9,10-diacetylaminotriphendioxazine
2,6,9,10-tetrabenzoylamino-3,7-diethoxy-triphendioxazine
2,6-dimethoxy-9,10-diacetylamino-triphendioxazine
2,6-diphenoxy-9,10-diacetylamino-triphendioxazine
2,6-dimethoxy-9,10-dibenzoylamino-triphendioxazine The above dioxazines are known compounds which can be obtained by conventional methods.

In addition to containing the indigoid or dioxazine pigment, the colourant of the present invention contains a polymer-soluble and thermoresistant dye which is different therefrom and which can belong to the most widely different classes of dye, for example to the anthraquinone, azo, azomethine, phthalocyanine, perinone, isoindolinone, perylene, methine or triazine series.

As representatives of the anthraquinone series there may be mentioned, for example, the aminoanthraquinones, alkylaminoanthraquinones, cyclohexylaminoanthraquinones, hydroxyalkylaminoanthraquinones and phenylaminoanthraquinones which are known as disperse dyes and especially as polymer-soluble colourants and which can additionally contain hydroxyl or phenylmercapto groups as further auxochromes.

Examples of such colourants are the arylaminoanthraquinones and aminohydroxyanthraquinones disclosed in French patent application Nos. 2,081,678 and 2,081,688, the 1,4-diphenylamino-5,8-dihydroxyanthraquinones disclosed in German Offenlegungsschrift 2,021,768, the cyclohexylaminoanthraquinones and toluidinoanthraquinones disclosed un U.S. patent specification 3,478,041, the reaction products of aminoanthraquinones with monohaloaryl ketones disclosed in German Auslegeschrift 1,128,066, or the phenylmercaptoanthraquinones disclosed in German Auslegeschrift 1,282,933 or the anthrapyridones disclosed in British patent specification No. 1,314,085 or in German Offenlegungsschrift 2,341,578.

Further possible examples of anthraquinone dyes are also vat dyes, provided they are sufficiently soluble in the polyester, for example acylaminoanthraquinones, such as 1-benzoylaminoanthraquinone, 1,5-dibenzoylaminoanthraquinone and 2,4-bis-(α-anthraquinonylamino)-6-phenyl-1,3,5-triazine.

Exemplary of dyes of the azo series are the azo dyes obtained by coupling diazotised anilines or heterocyclic amines with dialkylanilines, pyrazolones or pyridones and used for the mass colouration of polyesters and which are disclosed for example in British patent specification No. 1,326,941.

In addition, mention may also be made of the 1:2 metal complexes, in particular chromium and cobalt complexes, of o,o-dihydroxymonoazo dyes disclosed for example in Swiss Pat. specification No. 508,005.

As dyes of the azomethine series, special mention may be made of the aldimines obtained from salicylaldehydes or 2-hydroxy-1-naphthaldehyde with mono- or diaminobenzenes and the metal complexes thereof.

As examples of polymer-soluble phthalocyanines, there may be mentioned the alkylamides or alkoxyalkylamides of copper phthalocyaninetrisulfonic or -tetrasulfonic acid.

As representatives of methine dyes there may be mentioned the methylene-bis-pyrazolones described for example in U.S. Pat. No. 3,785,769, or the condensation products of cyanomethylbenzimidazoles and isoindolinones disclosed in British Pat. specification No. 1,403,510, or the condensation products of malonitrile and dialkylaminobenzaldehyde disclosed in many patent specifications, as well as the compounds described in U.S. Pat. No. 4,051,099, in particular those of the formula

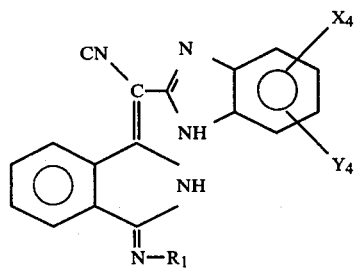

wherein $R_1$ represents a substituted or unsubstituted phenyl radical, $X_4$ and $Y_4$ represent hydrogen or halogen atoms or alkyl or alkoxy groups of 1 to 4 carbon atoms.

As representatives of the perylene series there may be mentioned for example the known polymer-soluble perylene-3,4,9,10-tetracarboxylic acid bis-arylimides, such as bis-2,3,6-trimethylphenylimide, bis-n-laurylimide, bis-3-methoxy-n-propylimide and bis-4-[N-propylsulfonamide]-phenylimide.

Finally, as a triazine dye, 2,4-di-(2'-hydroxynaphthyl)-6-pyrenyl-1,3,5-triazine may be cited by way of example.

The ratio of polymer-soluble dye to polyester can vary within wide limits, depending on the desired colour strength. In general, it is advisable to use 0.005 to 2.5% by weight of dye, based on the polyester.

At all events, both the thioindigo and/or dioxazine derivatives and the concurrently employed colourants must be completely dissolved in the polymer.

The thioindigo or dioxazine derivatives can be mixed with the polymer-soluble dye before or during the dyeing procedure. If mixing is effected before dyeing, a carrier can be added.

Suitable linear polyesters are in particular those which are obtained by polycondensation of terephthalic acid or an ester thereof with a glycol of the formula HO—$(CH_2)_n$—OH, in which n is an integer from 2 to 10, or with 1,4-di(hydroxymethyl)cyclohexane, or by polycondensation of a glycol ether of a hydroxybenzoic acid, for example p-($\beta$-hydroxyethoxy)-benzoic acid. The term "linear polyesters" also comprises copolyesters which are obtained by partial replacement of terephthalic acid by another dicarboxylic acid and/or by partial replacement of the glycol by another diol. However the preferred linear polyesters are polyethylene terephthalates.

The linear polyesters to be coloured are preferably homogeneously mixed with the dye in the form of powders, chips or granules. This can be accomplished for example by coating the polyester particles with the finely divided dry dyestuff powder or by treating the polyester particles with a solution or dispersion of the dye in water or an organic solvent and subsequently removing this latter. The treated polyester particles are fused by known methods in an extruder and pressed to objects, in particular sheets or filaments, or cast to boards. Instead of using the dyes by themselves, it is possible to use with advantage preparations which, in addition to the dye, contain 5 to 80%, preferably 20 to 80%, of a carrier, for example a polyethylene terephthalate used for fibre manufacture, or to use a polyester with low softening point, or a polyethylene or a polystyrene, preferably with a softening point above 100° C.

Finally, the colourant can also be added direct to the polyester melt, for example by the injection method.

The fibres which are spun dyed according to the invention can be topped with disperse dyes in the conventional manner.

As the thioindigo and the dioxazine derivatives result in good light-fastness but often poor textile fastness properties when colouring polyesters in concentrations of over 0.35% by weight, and in good textile but often poor lightfastness properties when colouring polyesters in concentrations of less than 0.05% by weight, it is surprising that, in the concentration range of 0.05 to 0.35% by weight of thioindigo or dioxazine derivatives employed in the present invention, both the lightfastness and textile fastness properties of the coloured fibres are good to very good.

It is furthermore surprising that optimum shading effects can be obtained with the concentrations of 0.05 to 0.35% by weight of thioindigo or dioxazine derivatives in mixtures with polymer-soluble colourants in colouring polyethylene terephthalate. The colourations are distinguished by great intensity, brilliance, purity and levelness.

The invention is illustrated by the following Examples, in which the parts and percentages are by weight, unless otherwise indicated.

EXAMPLE 1

1000 parts of polyethylene terephthalate granules, 10 parts of copper phthalocyaninetetrasulfonic acid 3-(isopropoxypropyl)amide and 2 parts of 1,5,9,10-tetrachloro-2,6-dimethoxytriphendioxazine are intensively mixed in a mixing drum and then dried for about 24 hours at 100° C. in vacuo at 15 mm Hg. The treated granules are spun by the melt spinning process at about 290° C., to yield blue fibres which have a substantially greater brilliance and a more intense blue colouration while retaining good lightfastness and textile properties compared with fibres coloured in the same concentration with the phthalocyanine dye alone.

EXAMPLE 2

100 parts of copper phthalocyaninetetrasulfonic acid (3-methoxypropyl)amide are thoroughly mixed for about 15 minutes with 20 parts of 4,4',7,7'-tetrachlorothioindigo in a turbomixer. Then 10 parts of this colourant mixture are intensively mixed in 1000 parts of polyethylene terephthalate (Diolen, smooth) for about 15 minutes in a mixing drum and the mixture is subsequently dried for about 24 hours at 100° C. in vacuo at 15 mm Hg. The granules are spun at about 290° C. by the melt spinning process, yielding blue fibres which have a substantially greater brilliance, colour strength and purity while retaining the good lightfastness and textile properties compared with fibres coloured in the same concentration without tetrachlorothioindigo.

EXAMPLES 3 TO 30

The procedure described in Example 1 is repeated, but using the dioxazine or thioindigo pigments listed in column 3 of the following table as shading component in admixture with the polymer-soluble colourant of column 5. Polyester fibres having the shade indicated in column 6 and of equally good properties are obtained.

| Ex. | Parts | Shading component | Parts | Polymer-soluble colourant | Shade |
|---|---|---|---|---|---|
| 3 | 2 | 9,10-dichloro-2,6-diethoxy-3,7-dibenzoylamino-triphendioxazine | 10 | [CuPc]—[SO$_2$HN(CH$_2$)$_3$OCH(CH$_3$)$_2$]$_4$ | brilliant blue |
| 4 | 2 | 9,10-dichloro-2,6-dimethoxy-3,7-dipropionylamino-triphendioxazine | 10 | [CuPc]—[SO$_2$HN(CH$_2$)$_3$OCH(CH$_3$)$_2$]$_4$ | brilliant blue |
| 5 | 2 | 4,4',7,7'-tetrachlorothioindigo | 10 | [CuPc]—[SO$_2$HN(CH$_2$)$_3$OCH(CH$_3$)$_2$]$_4$ | brilliant blue |
| 6 | 2 | 4,4'-dimethyl-6,6'-dichlorothioindigo | 10 | [CuPc]—[SO$_2$HN(CH$_2$)$_3$OCH(CH$_3$)$_2$]$_4$ | brilliant blue |

-continued

| Ex. | Parts | Shading component | Parts | Polymer-soluble colourant | Shade |
|---|---|---|---|---|---|
| 7 | 2 | 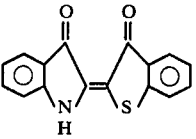 | 10 | [CuPc]—[SO$_2$HN(CH$_2$)$_3$OCH(CH$_3$)$_2$]$_4$ | brilliant blue |
| 8 | 2 | 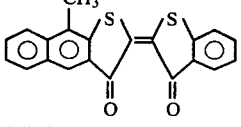 | 10 | [CuPc]—[SO$_2$HN(CH$_2$)$_3$OCH(CH$_3$)$_2$]$_4$ | brilliant, deep blue |
| 9 | 2 | 6,6'-diethoxythioindigo | 10 | [CuPc]—[SO$_2$HN(CH$_2$)$_3$OCH(CH$_3$)$_2$]$_4$ | dark blue |
| 10 | 2 | 6,6'-dichlorothioindigo | 10 | [CuPc]—[SO$_2$HN(CH$_2$)$_3$OCH(CH$_3$)$_2$]$_4$ | brilliant blue |
| 11 | 2 | 5,5'-dichloro-4,4',7,7'-tetramethyl-thioindigo | 10 | [CuPc]—[SO$_2$HN(CH$_2$)$_3$OCH(CH$_3$)$_2$]$_4$ | brilliant blue |
| 12 | 2 | 5,5'-dichloro-7,7'-dimethyl-thioindigo | 10 | [CuPc]—[SO$_2$HN(CH$_2$)$_3$OCH(CH$_3$)$_2$]$_4$ | brilliant blue |
| 13 | 2 | 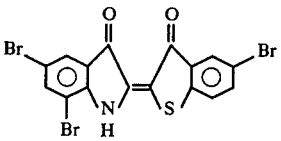 | 10 | [CuPc]—[SO$_2$HN(CH$_2$)$_3$OCH(CH$_3$)$_2$]$_4$ | brilliant blue |
| 14 | 2 | 1,5,9,10-tetrachloro-2,6-dimethoxy-triphendioxazine | 10 | 2,5-bis-(α-anthraquinonyl-amino)-4-phenyl-1,3,5-triazine | brilliant orange |
| 15 | 2 | 4,4',7,7'-tetrachlorothioindigo | 10 | 2,5-bis-(α-anthraquinonyl-amino)-4-phenyl-1,3,5-triazine | brilliant deep orange |
| 16 | 1 | 4,4'-dimethyl-6,6'-dichlorothioindigo | 10 | 2,5-bis-(α-anthraquinonyl-amino)-4-phenyl-1,3,5-triazine | brilliant orange |
| 17 | 2 | 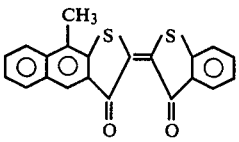 | 10 | 2,5-bis-(α-anthraquinonyl-amino)-4-phenyl-1,3,5-triazine | brilliant reddish brown |
| 18 | 2 | 5,6'-diethoxy-thioindigo | 10 | 2,5-bis-(α-anthraquinonyl-amino)-4-phenyl-1,3,5-triazine | brilliant orange |
| 19 | 2 | 6,6'-dichloro-thioindigo | 10 | 2,5-bis-(α-anthraquinonyl-amino)-4-phenyl-1,3,5-triazine | brilliant deep orange |
| 20 | 2 | 5,5'-dichloro-4,4',7,7'-tetramethylthioindigo | 10 | 2,5-bis-(α-anthraquinonyl-amino)-4-phenyl-1,3,5-triazine | brilliant brownish red |
| 21 | 2 | 5,5'-dichloro-7,7'-dimethyl-thioindigo | 10 | 2,5-bis-(α-anthraquinonyl-amino)-4-phenyl-1,3,5-triazine | brilliant brownish red |
| 22 | 1 | 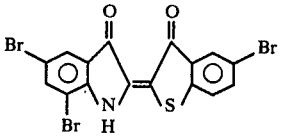 | 10 | 2,5-bis-(α-anthraquinonyl-amino)-4-phenyl-1,3,5-triazine | bronzy olive |
| 23 | 2 | 9,10-dichloro-2,6-diethoxy-3,7-dibenzoylamino-triphendioxazine | 10 | 2,4-di-(2'-hydroxynaphthyl)-6-pyrenyl-1,3,5-triazine | deep brown |
| 24 | 1 | 4,4',7,7'-tetrachlorthioindigo | 10 | 2,4-di-(2'-hydroxynaphthyl)-6-pyrenyl-1,3,5-triazine | brilliant orange |
| 25 | 1 | 9,10-dichloro-2,6-diethoxy-3,7-dibenzoylamino-triphendioxazine | 10 | 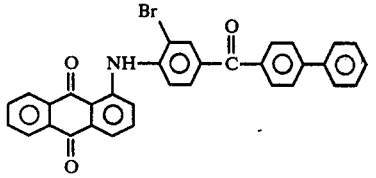 | reddish claret |

-continued

| Ex. | Parts | Shading component | Parts | Polymer-soluble colourant | Shade |
|---|---|---|---|---|---|
| 26 | 2 | 9,10-dichloro-2,6-diethoxy-3,7-dibenzoylamino-triphendioxazine | 10 | 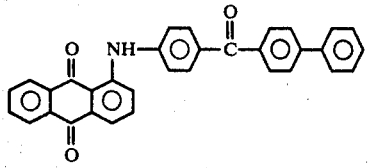 | bluish claret |
| 27 | 2 | 9,10-dichloro-2,6-dimethoxy-3,7-dipropionyl-amino-triphendioxazine | 5 | 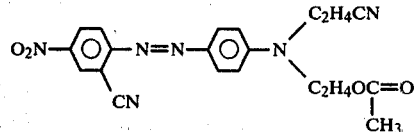 | bluish claret |
| 28 | 2 | 9,10-dichloro-2,6-dimethoxy-3,7-dipropionyl-amino-triphendioxazine | 5 | 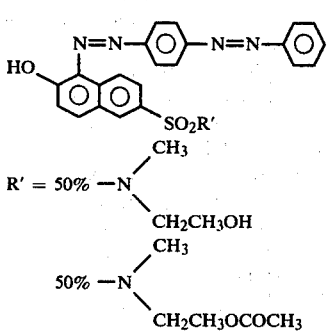 | bluish claret |
| 29 | 2 | 1,5,9,10-tetrachloro-2,6-dimethoxy-triphendioxazine | 10 | 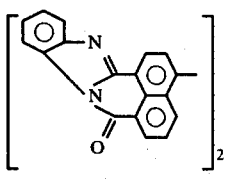 | brilliant deep orange |
| 30 | 2 | 9,10-dichloro-2,6-diethoxy-3,7-dibenzoylamino-triphendioxazine | 10 | 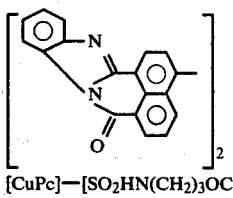 | bronzy brown |
| 31 | 2 | 9,10-dichloro-2,6-di-p-methoxyphenoxy-triphendioxazine | 10 | [CuPc]—[SO$_2$HN(CH$_2$)$_3$OCH(CH$_3$)$_2$]$_4$ | navy blue |
| 32 | 1 | 2,6-diamino-3,7,9,10-tetrachlorotriphendioxazine | 10 | [CuPc]—[SO$_2$HN(CH$_2$)$_3$OCH(CH$_3$)$_2$]$_4$ | blue |
| 33 | 1 | 2,6-dipropoxy-9,10-dibenzoyl-triphendioxazine | 10 | [CuPc]—[SO$_2$HN(CH$_2$)$_3$OCH(CH$_3$)$_2$]$_4$ | blue |
| 34 | 2 | 2,6-dipropoxy-9,10-dichloro-triphendioxazine | 10 | [CuPc]—[SO$_2$HN(CH$_2$)$_3$OCH(CH$_3$)$_2$]$_4$ | navy blue |
| 35 | 2 | 2,6-di-β-methoxyethoxy-triphendioxazine | 10 | [CuPc]—[SO$_2$HN(CH$_2$)$_3$OCH(CH$_3$)$_2$]$_4$ | navy blue |
| 36 | 2 | 1,5-dichloro-2,6-dimethoxy-9,10-dibenzoyl-triphendioxazine | 10 | 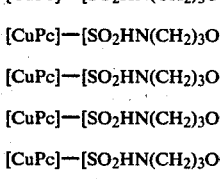 | orange |
| 37 | 2 | 2,6-diamino-3,7,9,10-tetrachlorotriphendioxazine | 10 | 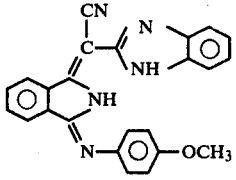 | dark brown |

What is claimed is:

1. A process for the mass coloration of a linear polyester by homogeneously mixing said polyester and a colorant which is a mixture consisting of (a) 0.05 to 0.35% by weight, based on the amount of polyester, of one thioindigo pigment, one dioxazine pigment or mixture of the two and (b) a polymer-soluble dye selected from the group consisting of anthraquinone, azo, azomethine, phthalocyanine, perinone, isondolinone, methine and triazine dyes.

2. A process according to claim 1 wherein the thioindigo pigment has the formula

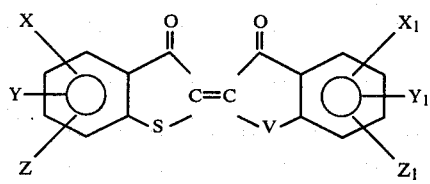

wherein V represents a sulfur atom or a —NH group, X and $X_1$ represent hydrogen or halogen atoms, alkyl or alkoxy groups of 1 to 4 carbon atoms, alkylsulfonyl groups of 1 to 4 carbon atoms or a phenoxy or phenylsulfonyl group which is unsubstituted or substituted by halogen atoms or alkyl or alkoxy groups of 1 to 4 carbon atoms, Y, $Y_1$, Z and $Z_1$ represent hydrogen or halogen atoms or methyl groups, or wherein X and Y or $X_1$ and $Y_1$ form a fused benzene nucleus which can be substituted by halogen atoms or alkyl or alkoxy groups of 1 to 4 carbon atoms.

3. A process according to claim 1 wherein the thioindigo pigment is 4,4'-7,7'-tetrachlorothioindigo.

4. A process according to claim 1 wherein the thioindigo pigment is asymmetrical.

5. A process according to claim 1 wherein the dioxazine pigment has the formula

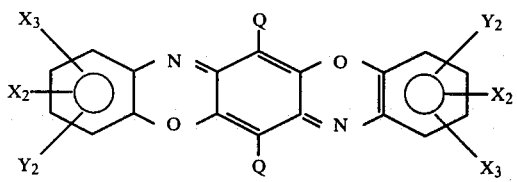

wherein Q represents a chlorine or bromine atom, a phenoxy, phenylmercapto or benzoyl group which is unsubstituted or substituted by halogen or alkyl or alkoxy of 1 to 4 carbon atoms, or represents an alkoxycarbonyl group of 2 to 5 carbon atoms, $Y_2$ represents an alkoxy group of 1 to 12 carbon atoms, a cycloalkoxy group of 5 or 6 carbon atoms, a hydroxyalkoxy group of 2 to 6 carbon atoms, an alkoxyalkoxy or alkanoyloxyalkoxy group of 3 to 8 carbon atoms, a phenoxy group, a phenoxy($C_2$-$C_6$)alkoxy group or benzoyloxy($C_2$-$C_6$)alkoxy group, whilst the phenyl moieties of the last three substituents can contain halogen atoms or alkyl or alkoxy groups, or represents a naphthoxy- or tetrahydronaphthoxy group, or a naphthoxy($C_2$-$C_6$)alkoxy group or a tetrahydronaphthoxy($C_2$-$C_6$)alkoxy group, $X_2$ has the same meaning as $Y_2$ and can additionally represent a hydrogen or halogen atom, an alkanoylamino group of 2 to 6 carbon atoms, a benzoylamino group which is unsubstituted or substituted by halogen or alkyl or alkoxy of 1 to 6 carbon atoms, or represents a trifluoromethyl group, an alkylsulfonyl group of 1 to 6 carbon atoms, a phenyl, benzoyl or phenylmercapto group, $X_3$ represents a hydrogen or halogen atom, or wherein $X_2$ and $X_3$ form a fused benzene ring.

6. A process according to claim 1 wherein the a dioxazine pigment has the formula

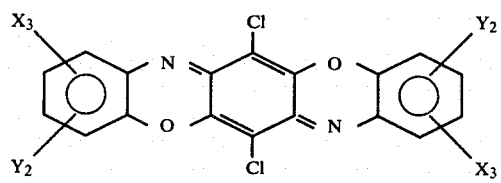

7. A process according to claim 1 wherein the a dioxazine pigment has the formula

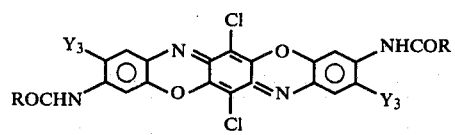

wherein R represents an alkyl group of 1 to 6 carbon atoms or a phenyl radical which is unsubstituted or substituted by halogen or alkyl or alkoxy of 1 to 6 carbon atoms, and $Y_3$ represents an alkoxy group of 1 to 6 carbon atoms.

8. A process according to claim 1 wherein 0.10 to 0.25% of the thioindigo and/or dioxazine pigment is used.

9. A linear polyester containing 0.05 to 0.35% by weight of a thioindigo or dioxazine pigment and one or more polymer-soluble dyes according to claim 1.

* * * * *